(12) United States Patent
Kuehn et al.

(10) Patent No.: US 6,968,858 B2
(45) Date of Patent: Nov. 29, 2005

(54) CHECK VALVE

(75) Inventors: Michael Kuehn, Bietigheim-Bissingen (DE); Ulrich Mueller, Gerlingen (DE)

(73) Assignee: Robert Bosch GmbH, Stuttgart (DE)

( * ) Notice: Subject to any disclaimer, the term of this patent is extended or adjusted under 35 U.S.C. 154(b) by 44 days.

(21) Appl. No.: 10/449,095

(22) Filed: Jun. 2, 2003

(65) Prior Publication Data
US 2004/0007271 A1 Jan. 15, 2004

(30) Foreign Application Priority Data
Jun. 1, 2002 (DE) ................................ 102 24 430

(51) Int. Cl.[7] ............................................. F16K 15/02
(52) U.S. Cl. ................... 137/539.5; 137/542; 137/540; 137/539; 251/284
(58) Field of Search .................. 137/533.17, 533.19, 137/539, 539.5, 543.19, 542; 251/284

(56) References Cited

U.S. PATENT DOCUMENTS

| | | | | |
|---|---|---|---|---|
| 3,664,368 A | * | 5/1972 | Sweeney | 137/480 |
| 3,765,447 A | * | 10/1973 | Cornell | 137/538 |
| 4,286,622 A | * | 9/1981 | Ninomiya et al. | 137/533.11 |
| 4,700,741 A | * | 10/1987 | Murphy | 137/543.19 |
| 5,251,664 A | * | 10/1993 | Arvidsson et al. | 137/514 |
| 5,421,306 A | * | 6/1995 | Talaski | 123/510 |
| 5,595,213 A | * | 1/1997 | Brown | 137/515.5 |
| 6,401,749 B1 | * | 6/2002 | Tai et al. | 137/540 |

FOREIGN PATENT DOCUMENTS

DE 40 29 909 A1 * 3/1992

* cited by examiner

Primary Examiner—Ramesh Krishnamurthy
(74) Attorney, Agent, or Firm—Ronald E. Greigg

(57) ABSTRACT

The check valve according to the invention significantly reduces the generation of noise by producing an asymmetrical circulation around the closing body causing a force resulting from the flow and acting on the closing body to have a transverse component in relation to the opening direction, as a result of which increased friction and damping are generated in the closing body guide. The closing body may be asymmetrically embodied, or the housing wall encompassing the closing body may be provided with a conduit extending in the opening direction over at least a part of the travel path of the closing body.

17 Claims, 3 Drawing Sheets

CHECK VALVE

BACKGROUND OF THE INVENTION

1. Field of the Invention

The invention is directed to check valve in which noise generation is reduced.

2. Description of the Prior Art

A check valve is known from DE 195 07 321 C2, in which vibrations and pressure pulsations are suppressed by virtue of the closing body being damped when it reaches its open end position. Before reaching this end position, however, the closing body can vibrate freely so that noise and pressure pulsations can occur.

OBJECT AND SUMMARY OF THE INVENTION

The check valve according to the invention has the advantage over the prior art that the generation of noise is sharply reduced. The asymmetrical circulation around the closing body causes the force resulting from the flow and acting on the closing body to have a transverse component in relation to the opening direction, as a result of which, increased friction and damping are generated in the closing body guide. These friction forces are proportional to the flow and therefore only occur when there is flow through the check valve, thus assuring a reliable insertion of the closing body into the valve seat when the delivery stops. The friction forces acting in the closing body guide result in a reduction of vibrations and pressure pulsations over the entire travel path of the closing body and not only when it is resting in the end position.

Advantageous modifications and improvements of the check valve are also possible. For example, asymmetrical circulation around the closing body can preferably be achieved by virtue of the closing body being asymmetrically designed or the housing wall that encompasses the closing body being asymmetrical, for example by virtue of a channel that extends in the opening direction over at least part of the travel path of the closing body being provided in the housing wall that encompasses the closing body, or by virtue of both the closing body and the housing wall that encompasses it being asymmetrical.

It is also advantageous to provide the closing body as being comprised of a closing section with an adjoining cylindrical section and to achieve the asymmetry by providing a flattening in the cylindrical section.

It is advantageous to design the closing section in the form of a sphere, a sphere segment, or a truncated cone since all of these embodiments are automatically centered as they are inserted into the valve seat and therefore produce a reliable seal. Embodying the closing body as a sphere is also advantageous because spheres can be inexpensively produced as mass produced products with a high degree of precision and in large production runs.

Making the closing section out of rubber or plastic has the advantage of a favorable damping of the closing body when it is inserted into the valve seat.

BRIEF DESCRIPTION OF THE DRAWINGS

The invention will be better understood and further objects and advantages thereof will become more apparent from the ensuing detailed description of preferred embodiments taken in conjunction with the drawings, in which.

DESCRIPTION OF THE PREFERRED EMBODIMENTS

Figure 1:
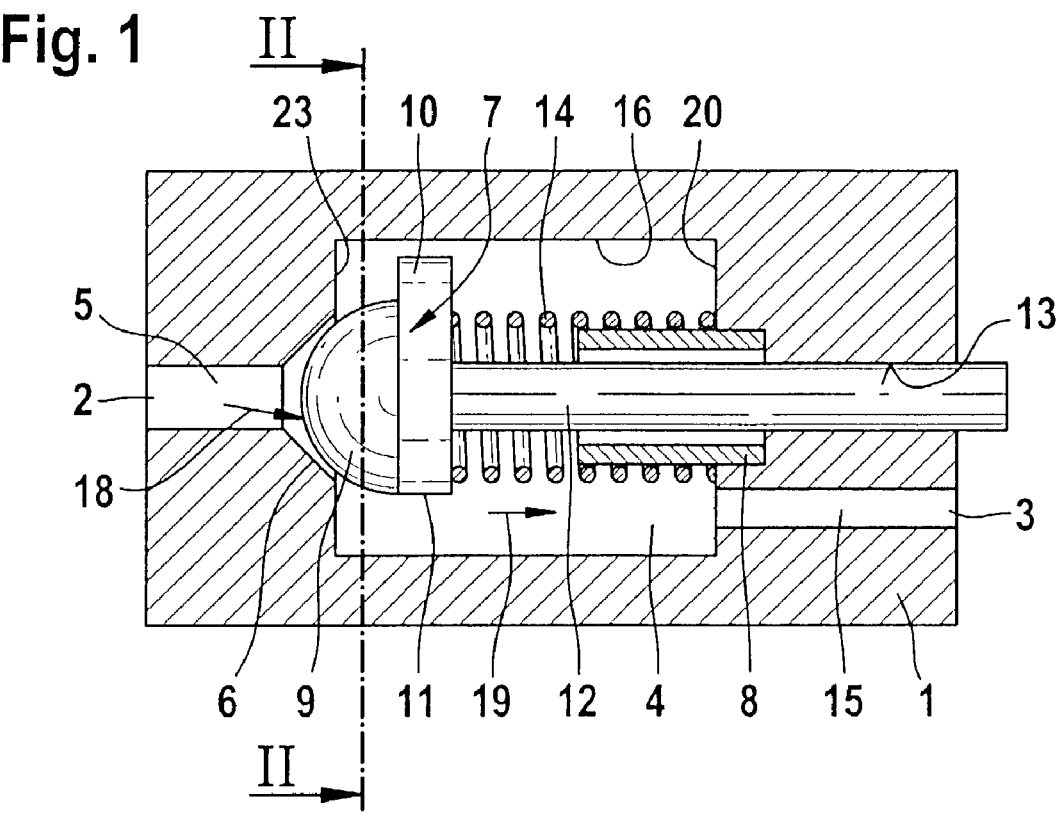
FIG. 1 shows a sectional view of the check valve with an asymmetrical closing body.

FIG. 1 shows a check valve according to the invention. A fluid can flow through this valve only in a flow direction. As a result, it can be used, for example, in a fuel supply unit of an internal combustion engine, which usually contains a fuel pump. The fuel pump delivers fuel under pressure to an internal combustion engine. For this particular application, the check valve is disposed between the fuel pump and the internal combustion engine and when the fuel pump is switched off, prevents fuel from flowing back to the fuel pump from the internal combustion engine. This maintains the fuel pressure in the internal combustion engine.

The check valve includes a housing 1 having an inlet opening 2 and an outlet opening 3, which communicate with an inner chamber 4. The inlet opening 2 leads to an inlet conduit 5, which at its other end, transitions into a for example conical valve seat 6. The valve seat 6 is disposed in a first end wall 23 of the inner chamber 4, which contains a movable closing body 7 and has an outlet conduit 15 with the outlet opening 3. The cross section of the inner chamber 4 is cylindrical. The inner chamber 4 is radially defined by a housing wall 16. When the check valve is closed, the closing body 7 rests against the for example conical valve seat 6. A stop 8 limits the movement of the closing body in the opening direction 19. The closing body 7 is comprised of a closing section 9, which is oriented toward the valve seat 6 and designed for example in the form of a hemisphere or truncated cone, and an adjoining cylindrical section 10 that is provided with a flattening 11. The closing section 9 here is comprised of rubber or plastic, for example. The diameter of the cylindrical section 10 can be greater than, equal to or smaller than the diameter of the closing section. The cylindrical section 10 is adjoined by a guide pin 12, which is guided in a guide bore 13 of the housing 1. A compression spring 14 rests against the cylindrical section 10 of the closing body 7 and against the end wall 20 of the housing 1 and presses the closing body 7 toward the valve seat 6.

If the fuel pressure upstream of the valve seat 6 exceeds a predetermined value, then the closing body 7 lifts away from the valve seat 6. The check valve opens and fuel flows through the inlet conduit 5, the inner chamber 4, and the outlet conduit 15.

The flattening 11 generates an asymmetrical circulation around the closing body 7. The flattening 11 is best seen in the cross section view of FIG. 2. In the vicinity of the flattening 11, the flow between the housing wall 16 and the cylindrical section 10 is accelerated less powerfully than in the remaining cross section. This causes the resulting force 18 acting on the closing body to have a transverse component in relation to the opening direction 19. This transverse component provides greater friction forces between the guide pin 12 and guide bore 13, which reduces the vibrations of the closing body 7 during the entire motion of the closing body 7.

If the fuel pressure falls below the predetermined value, e.g. when the fuel pump is switched off, then the check valve closes again and the delivery of fuel to the internal combustion engine stops.

Figure 3:
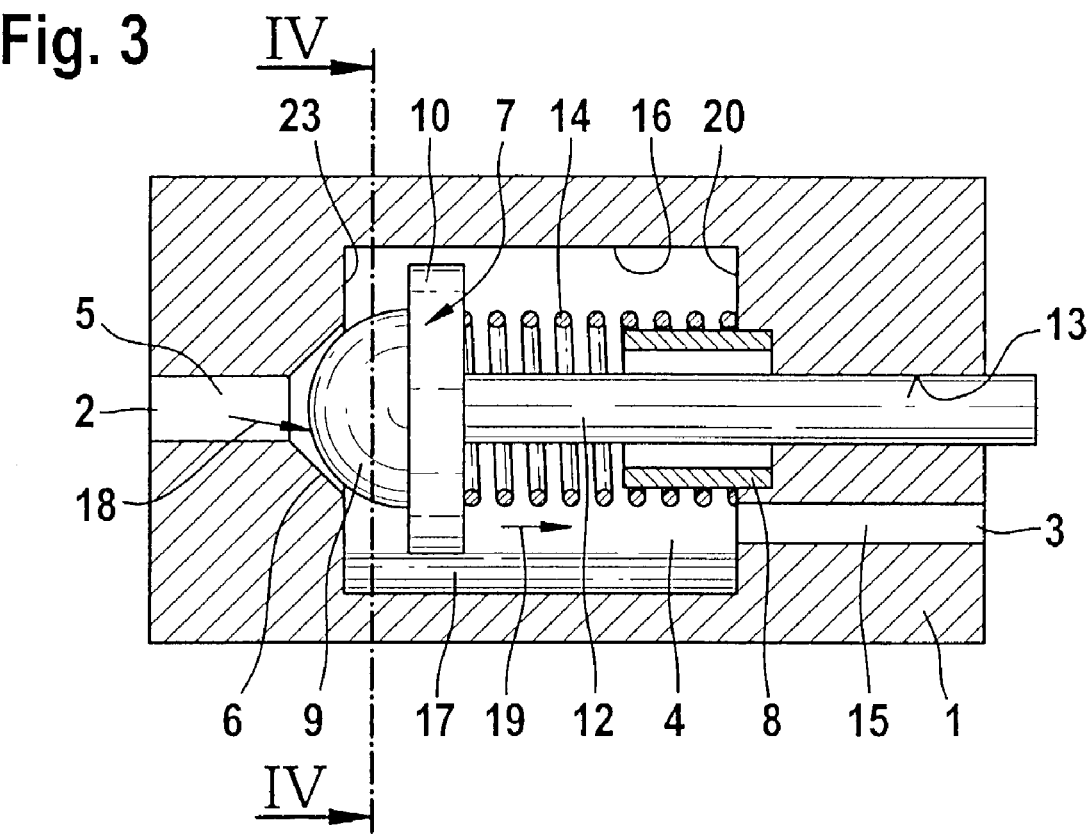
FIG. 3 shows a sectional view of the check valve with an asymmetrical housing wall.
Figure 4:
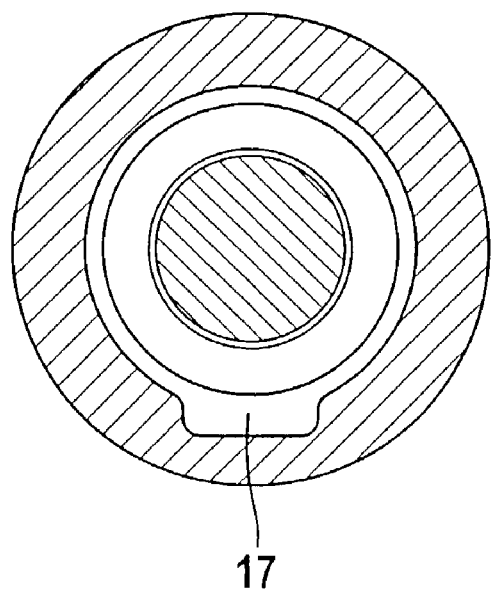
FIG. 4 shows a sectional view along the line IV—IV in FIG. 3.

In the check valve according to FIG. 3, parts that remain the same or function in the same manner in comparison to the check valve in FIG. 1 are labeled with the same reference numerals, but the asymmetrical circulation around the closing body 7 is not achieved with a flattening 11 as in the check valve in FIG. 1, but is instead achieved by virtue of the fact that when the cylindrical section 10 is embodied as continuously circular, a conduit 17 extending in the opening direction 19 of the closing body 7 is provided in the housing wall 16 of the inner chamber 4. The conduit 17 is shown in the cross section in FIG. 4, a sectional view along the line IV—IV in FIG. 3. It can have a cross section that is rectangular, triangular, rounded, or the like. This embodiment, too, causes the resulting force 18 acting on the closing body to have a transverse component in relation to the opening direction 19.

Figure 5:
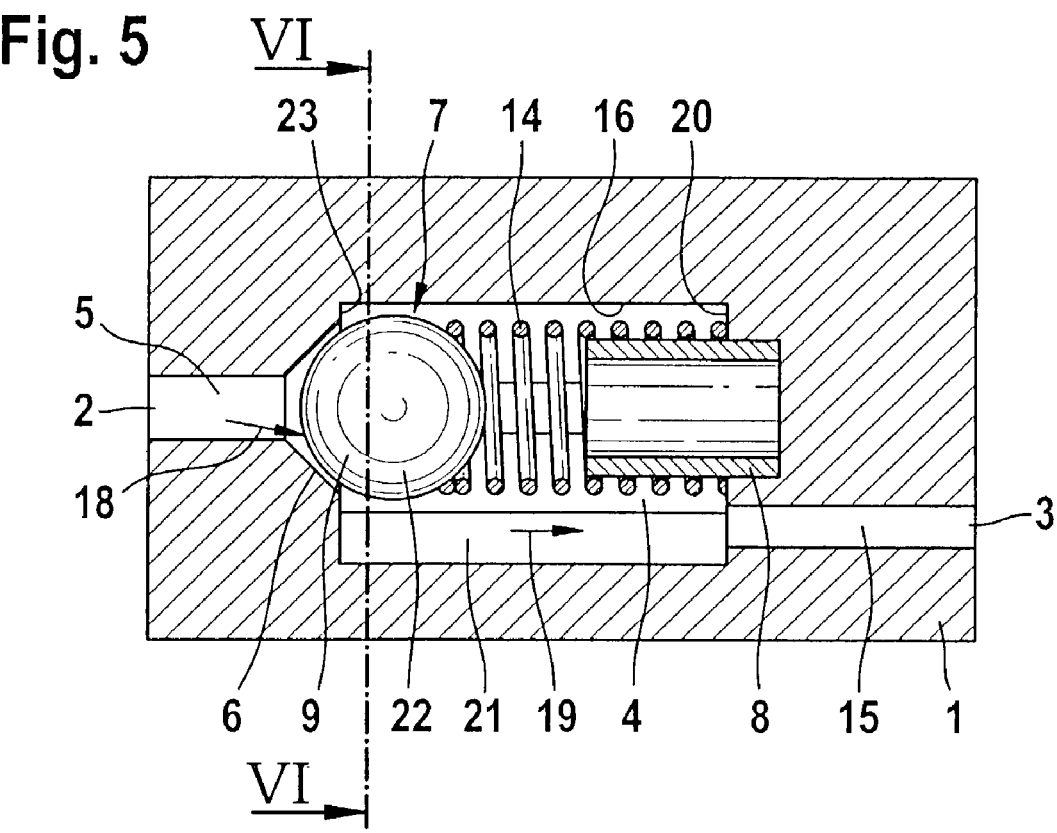
FIG. 5 shows a view of the check valve with an asymmetrical housing wall and with a sphere as a closing body.
Figure 6:
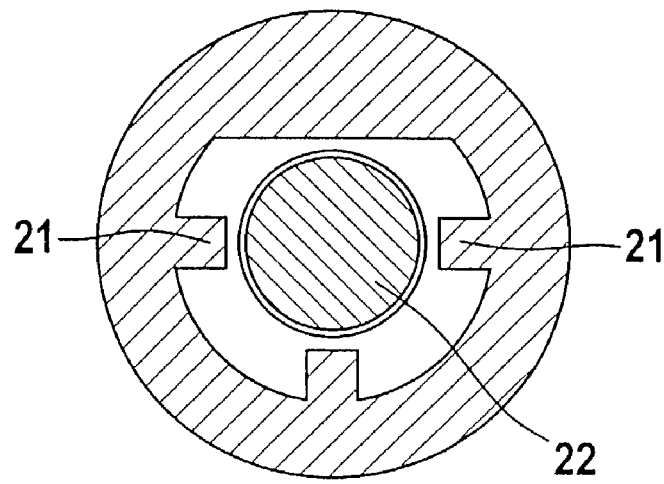
FIG. 6 shows a sectional view along the line VI—VI in FIG. 5.

In the check valve according to FIG. 5, parts that remain the same or function in the same manner in comparison to the check valve in FIGS. 1 to 4 are labeled with the same reference numerals. The check valve according to FIG. 5 differs from the check valve in FIGS. 1 to 4 in that the closing body 7 is embodied as a sphere 22, which a compression spring 14 presses into the valve seat 6. Several ribs 21 distributed over the circumference of the inner chamber 4 guide the sphere 22. When a sphere is used as the closing body, an asymmetrical circulation around the closing body 7 can be achieved with an asymmetrical housing wall 16, which likewise gives the resulting force 18 acting on the closing body a transverse component in relation to the opening direction 19. The asymmetrical housing wall 16 is shown in the cross section in FIG. 6, a sectional view along the line VI—VI in FIG. 5. This transverse component provides greater friction forces between the sphere 22 and the ribs 21, which reduces the vibrations of the closing body 7 during the entire motion of the closing body 7.

Figure 2:
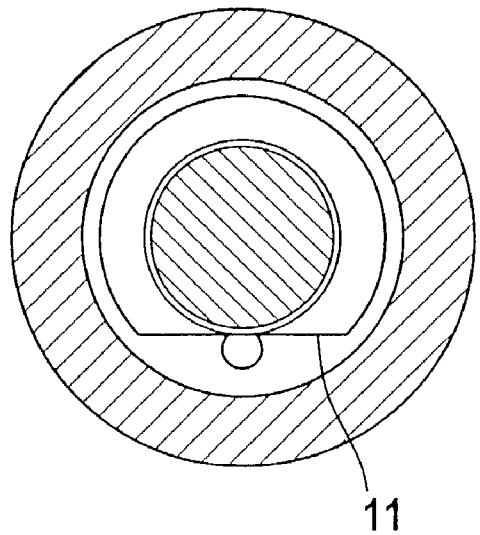
FIG. 2 shows a sectional view along the line II—II in FIG. 1.

By contrast with the exemplary embodiments according to FIGS. 1, 2, and FIGS. 3, 4, in another embodiment, the check valve can naturally also be designed so that a flattening 11 on the cylindrical section 10 is provided in accordance with the exemplary embodiment according to FIG. 1 and a conduit 17 in the housing wall 16 of the inner chamber 4 is also provided in accordance with the exemplary embodiment according to FIG. 2.

The foregoing relates to preferred exemplary embodiments of the invention, it being understood that other variants and embodiments thereof are possible within the spirit and scope of the invention, the latter being defined by the appended claims.

We claim:

1. A check valve comprising
   a housing having an inlet opening, an outlet opening, and an inner chamber that has a valve seat on the inlet end,
   a movable closing body contained in the inner chamber,
   a stop limiting the movement of the closing body in the opening direction,
   a valve spring acting on the closing body in the closing direction of the check valve, and
   means for generating an asymmetrical flow around the closing body (7, 22) when the check valve opens that produces a force acting on the closing body (7, 22), said force having a transverse component in relation to the opening direction (19), wherein the means for generating an asymmetrical flow around the closing body (7) comprises a closing body which is asymmetrical about its longitudinal axis.

2. The check valve according to claim 1, wherein the closing body (7) comprises a closing section (9) oriented toward the valve seat (6) and an adjoining downstream cylindrical section (10).

3. The check valve according to claim 2, wherein the closing section (9) is embodied as a segment of a sphere.

4. The check valve according to claim 2, wherein the closing section (9) is embodied as a truncated cone.

5. The check valve according to claim 2, wherein the means for generating an asymmetrical flow around the closing body comprises a flattened section on a circumference of the cylindrical section (10).

6. The check valve according to claim 2, wherein the closing section (9) is comprised of rubber or plastic.

7. The check valve according to claim 1, wherein the closing body is embodied as a sphere (22).

8. The check valve according to claim 1, wherein the valve seat (6) is embodied as conical.

9. A check valve comprising
   a housing having an inlet opening, an outlet opening, and an inner chamber that has a valve seat on the inlet end,
   a movable closing body contained in the inner chamber,
   a stop limiting the movement of the closing body in the opening direction,
   a valve spring acting on the closing body in the closing direction of the check valve, and
   means for generating an asymmetrical flow around the closing body (7, 22) when the check valve opens that produces a force acting on the closing body (7, 22), said force having a transverse component in relation to the opening direction (19), wherein the inner chamber (4) encompassing the closing body (7, 22) comprises a cylindrical housing wall (16) and wherein the means for generating an asymmetrical flow around the closing body comprises at least one conduit (17) in the cylindrical housing wall (16) that extends in the opening direction (19).

10. The check valve according to claim 9, wherein the closing body (7) comprises a closing section (9) oriented toward the valve seat (6) and an adjoining downstream cylindrical section (10).

11. The check valve according to claim 10, wherein the closing section (9) is embodied as a segment of a sphere.

12. The check valve according to claim 10, wherein the closing section (9) is embodied as a truncated cone.

13. The check valve according to claim 10, wherein the means for generating an asymmetrical flow around the closing body comprises a flattened section on a circumference of the cylindrical section (10).

14. The check valve according to claim 10, wherein the closing section (9) is comprised of rubber or plastic.

15. The check valve according to claim 9, wherein the closing body is embodied as a sphere (22).

16. The check valve according to claim 9, wherein the valve seat (6) is embodied as conical.

17. A check valve comprising
a housing having an inlet opening, an outlet opening, and an inner chamber that has a valve seat on the inlet end,
a movable closing body contained in the inner chamber,
a stop limiting the movement of the closing body in the opening direction,
a valve spring acting on the closing body in the closing direction of the check valve, and
means for generating an asymmetrical flow around the closing body (7, 22) when the check valve opens that produces a force acting on the closing body (7, 22), said force having a transverse component in relation to the opening direction (19), wherein the closing body (7) comprises a closing section (9) oriented toward the valve seat (6) and an adjoining downstream cylindrical section (10), and wherein the means for generating an asymmetrical flow around the closing body comprises a flattened section on a circumference of the cylindrical section (10).

* * * * *